US012806690B2

(12) United States Patent
Jakob et al.

(10) Patent No.: US 12,806,690 B2
(45) Date of Patent: Nov. 24, 2026

(54) DEVICE AND METHOD FOR MACHINING A SURFACE OF A WORKPIECE

(71) Applicant: AKTIEBOLAGET SKF, Gothenburg (SE)

(72) Inventors: Marcus Armin Jakob, North Charleston, SC (US); David C. Thomas, Sumter, SC (US); Robert Schmal, Poppenhausen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 873 days.

(21) Appl. No.: 17/809,356

(22) Filed: Jun. 28, 2022

(65) Prior Publication Data

US 2024/0075533 A1 Mar. 7, 2024

(51) Int. Cl.

| | |
|---|---|
| ***B23C 3/04*** | (2006.01) |
| ***B23B 1/00*** | (2006.01) |
| ***B23Q 1/48*** | (2006.01) |
| ***B23Q 1/54*** | (2006.01) |

(52) U.S. Cl.

CPC .............. *B23B 1/00* (2013.01); *B23Q 1/4852* (2013.01); *B23Q 1/5481* (2013.01); *B23C 3/04* (2013.01)

(58) Field of Classification Search

CPC ...... B23Q 1/4852; B23Q 1/5481; B23C 3/04; B23C 3/02; B23C 2210/203; B23C 2210/204; B23C 2210/242; B23C 2220/04

See application file for complete search history.

(56) References Cited

FOREIGN PATENT DOCUMENTS

| | | | | |
|---|---|---|---|---|
| CH | 702859 A2 * | 9/2011 | ........... | B23Q 1/4852 |
| DE | 102008036121 A1 * | 2/2010 | ............... | B23C 3/04 |

OTHER PUBLICATIONS

CH-702859-A2 Translation; Cedric Paroz, Piece Milling System For Mechanical Fabrication Field, Sep. 30, 2011 (Year 2011).*
DE-102008036121-A1, Alexander Vincon, DE-102008036121-A1, Feb. 4, 2010 (Year 2010).*

* cited by examiner

*Primary Examiner* — Sara Addisu
(74) *Attorney, Agent, or Firm* — J-TEK LAW PLLC; Scott T. Wakeman; Mark A. Ussai

(57) ABSTRACT

A device for machining a surface of a workpiece includes a workpiece holder configured to rotate the workpiece about a workpiece rotational axis, a tool having a tool rotational axis and at least one blade having a blade radius of curvature and a tool holder configured to position the tool such that an active point of the blade comes into engagement with the workpiece and configured to pivot the tool about the tool rotational axis and to configured to move the tool with an advancing motion such that the active point of the blade shifts along the blade. The advancing motion is defined by a curve having at least a first radius of curvature and a second radius of curvature.

13 Claims, 3 Drawing Sheets

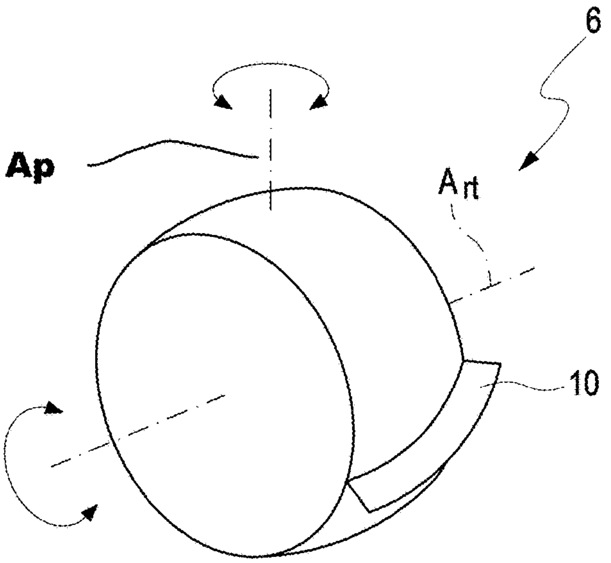
Fig. 2
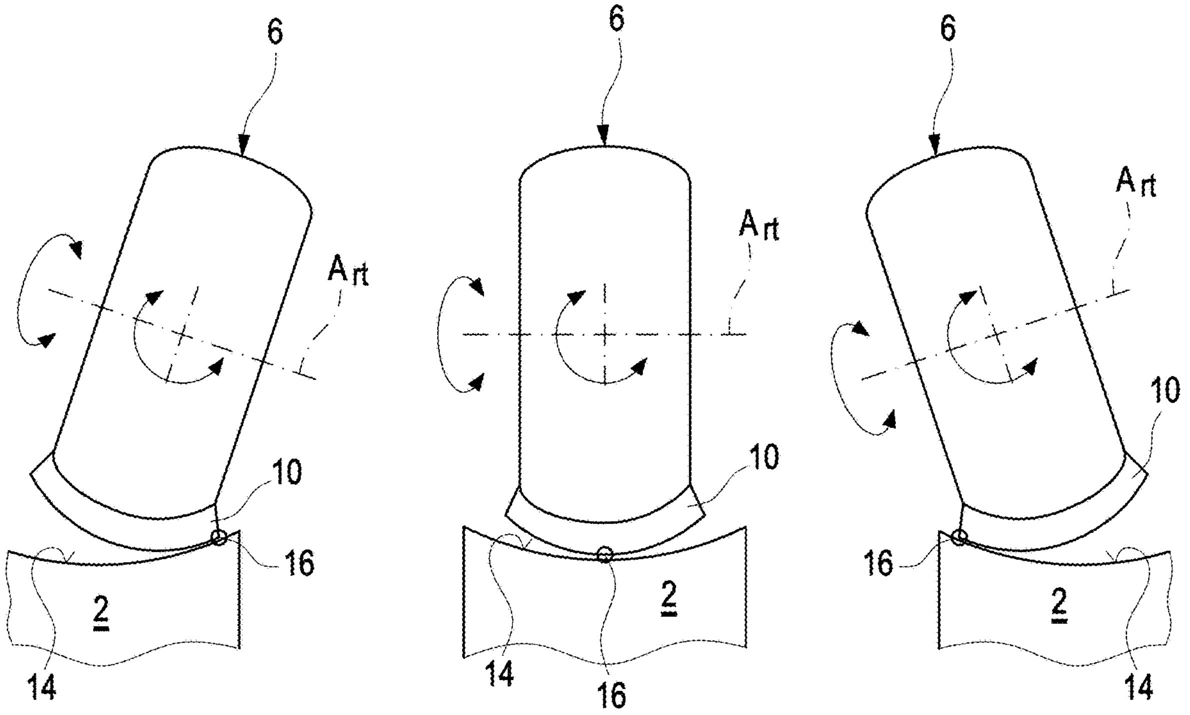
Fig. 3 A
Fig. 3 B
Fig. 3 C

DEVICE AND METHOD FOR MACHINING A SURFACE OF A WORKPIECE

TECHNOLOGICAL FIELD

The present disclosure is directed to a device for machining a surface of a workpiece, a method for machining a surface of a workpiece, and a bearing component made with the device.

BACKGROUND

The machining of surfaces of a workpiece, particularly rotationally symmetric surfaces, is normally accomplished by turning. In rotational machining or turning, the workpiece is rotationally driven around the rotational axis of the workpiece, which is referred to as the C axis. The tool is radially placed in the X axis at the depth of the cut. During rotation, the tool is advanced in a motion in parallel to the C axis. In this rotational machining, the resulting rotationally symmetric surface acquires a helical surface structure, which is referred to as a twist, sometimes referred to as lead marks. *Ibis* twist can be disadvantageous if, for example, shaft exit points of motors, drives and other machines are to be sealed in the area of these surfaces by radially fitting gaskets. Depending on the direction of the shaft rotation, the twist can cause oil to be conveyed to the exterior at the gasket location or dirt or water to be conveyed to the interior.

Thus, in the production of rotationally symmetric surfaces of workpieces there is often a need for twist clearance. To produce a rotationally symmetric surface corresponding to these requirements and, if possible, without twist, machining methods such as grinding, belt grinding, superfinishing, machining in hardened material or finish rolling are therefore applied. These machining processes require an additional processing step, which increases the complexity of production because an additional machine is generally required, and the workpiece must be rechecked.

SUMMARY

It is therefore an aspect of the present disclosure to provide a method and device for machining surfaces of a workpiece, which allows twist-free machining of curved surfaces in a simple manner with a high volume of metal removed.

In the following, a device for machining a surface of a workpiece is provided. The device comprises a workpiece holder configured to rotate the workpiece about a workpiece rotational axis. The workpiece may be a bearing component such as an inner ring, an outer ring, and/or a rolling element. The device further includes a tool having a tool rotational axis and at least one blade having a blade curvature defined by at least one radius. For example, the blade may be shaped as a helical curve coaxial to the tool rotational axis. However, the blade may have any other shape. For example, the blade may have an elliptical shape, a semicircular shape, a cylindrical shape, or the like.

Moreover, the device comprises a tool holder and a holder support configured to position the tool such that an active point of the blade comes into engagement with the workpiece, to pivot the tool with a pivot motion about the tool rotational axis and to move the tool with an advancing motion such that the active point of the blade shifts along the blade. For example, the pivot motion and the advancing motion may be performed simultaneously. That is, the tool is pivoted while the tool is moved with advancing motion.

Preferably, the holder support is further configured to vary a speed of the pivot motion. As used herein, the "active point" of a blade is the location along the length of the curved blade that contacts a surface of the workpiece when the surface of the workpiece is flat or has a curvature different than that of the blade. Due to physical limitations, the "active point" will comprise a short section of the blade rather than a mathematical point.

Preferably, the holder support comprises a first disk, a second disk and a third disk, the second disk being stacked on the third disk and the first disk being stacked on the second disk and the tool holder being mounted to a top surface of the first disk. The first, second and third disks are independently rotatable about a common pivot axis perpendicular to the tool rotational axis.

Because the blade only engages a limited area of the active site, only relatively minor cutting forces occur, even in the case of a wider blade. Good surface quality can be achieved, even with hardened workpieces. For example, the holder support can be configured to pivot the tool around a pivot axis perpendicular to the tool rotational axis by rotating the first, second and/or third disks to move the tool holder. In order to facilitate the radial positioning of the tool, the pivoting angle of the tool may be increased in both directions by an angle so that the blade does not collide with the workpiece prior to the machining and can safely emerge after the machining.

The advancing motion is defined by a curve having at least a first radius of curvature and a second radius of curvature. For example, the curve may be compiled by a superposition of a first curve having the first radius of curvature and a second curve having second radius of curvature, wherein each of the first and second curve may be multiplied with a respective weighing coefficient. Using an advancing motion having at least a first radius of curvature and a second radius of curvature allows not only straight surfaces but also surfaces that are curved such as a raceway of a ball bearing to be machined.

The tool can engage the external circumference of the workpiece to produce a rotationally symmetric exterior surface of the workpiece. Also, an interior surface of the workpiece can be produced. End faces of the workpiece can also be machined if the tool rotational axis is positioned perpendicular to the workpiece rotational axis.

Preferably, the tool holder may be equipped with a tool carrier that can be rotated around the tool rotational axis. One or more circumferential tools can be arranged along the circumference of the tool carrier. If several tools are provided, they can be shaped identically so that when one tool becomes worn out the tool carrier can be advanced to a new tool. It is also possible to mount differently shaped tools on the tool carrier, which can then be used optionally to produce various surfaces. Even when several tools are arranged on the circumference of the tool carrier, only one of these tools is used at a time during the machining process. The tool carrier is also rotated during the machining process only by an arc angle that corresponds to the arc angle across which the respective blade of the tool being used extends. Additionally or alternatively, the tool may provide more than one blade, preferably two to five blades.

According to a further embodiment, the surface to be machined is rotationally symmetric with regard to an axis of symmetry and has at least one curvature in an axial direction of the axis of symmetry. Preferably, the curve defining the advancing motion has a varying radius of curvature. This allows curved surfaces such as raceways for ball bearings or spherical rollers to be created. Furthermore, a radius of curvature of the blade may be smaller than a radius of curvature of the surface to be machined. Preferably, an angle around which the tool is pivoted is determined based on the blade curvature and/or the curvature of the surface to be machined.

According to a further embodiment, the holder support is configured to move the tool along a first axis and a second axis, wherein the first axis and the second axis are perpendicular to each other and define a mounting plane of the tool, and to rotate the tool around a normal vector of the mounting plane of the tool. For example, the tool holder may be configured to move the tool in an X-Z plane, wherein Z is the tool rotation axis and X is perpendicular to Z, and to rotate the tool around an axis Y, which is perpendicular to X and Z. A tool holder configured as described above allows the tool to move in an advancing motion that has at least two curvature radii. Also, moving the tool allow surfaces having a larger axial width than an axial width of the blade to be machined.

Preferably, the workpiece holder is further configured to move the workpiece along an axis which is perpendicular to the workpiece rotation axis, wherein the axis and a normal vector of a mounting plane of the tool define an inclination angle between them, wherein the inclination angle is between 0° and 90°.

According to a further embodiment, the blade is made from a material having a hardness that is greater than a hardness of a material of the workpiece. For example, the blade may be made of cubic boron nitride (CBN), ceramic, and/or diamond. Furthermore, the blade may be inclined with respect to the surface to be machined at an angle between 10° and 30°. The blade may be connected to the tool with any suitable fastening method. In particular, the blade may be press-fitted, interference-fitted, and/or materially bonded to the tool. For example, the blade may be glued and/or fixed with a tongue and groove connection.

According to a further aspect, a method for machining a surface of a workpiece is provided. The method comprises:

- rotating the workpiece about a workpiece rotational axis,
- moving a tool having a tool rotational axis and at least one blade having a blade curvature such that an active point of the blade comes into engagement with the workpiece,
- pivoting the tool with a pivot motion about the tool rotational axis and moving the tool with an advancing motion such that the active point of the blade shifts along the blade,
- wherein the advancing motion is defined by a curve having at least a first radius of curvature and a second radius of curvature.

Preferably, the method further comprises parameterizing the surface to be machined and determining the advancing motion based on the parameterized surface to be machined.

According to a further aspect, a bearing component is provided which is made by the device described above and/or is made by using the above-mentioned method.

An even further aspect of the present disclosure relates to a computer program product comprising a non-transient machine readable computer program code which is adapted to prompt a control unit, e.g., a computer, and/or a computer of the above discussed method to perform the above discussed steps.

The computer program product may be a provided as memory device, such as a memory card, USB stick, CD-ROM, DVD and/or may be a file which may be downloaded from a server, particularly a remote server, in a network. The network may be a wireless communication network for transferring the file with the computer program product.

Further preferred embodiments are defined in the dependent claims as well as in the description and the figures. Thereby, elements described or shown in combination with other elements may be present alone or in combination with other elements without departing from the scope of protection.

In the following, preferred embodiments of the invention are described in relation to the drawings, wherein the drawings are exemplarily only, and are not intended to limit the scope of protection. The scope of protection is defined by the accompanied claims, only.

BRIEF DESCRIPTION OF THE DRAWINGS

FIG. 2 is a tool for the device of FIG. 1.

FIGS. 3A-3C illustrate the tool of FIG. 2 during a machining process.

DETAILED DESCRIPTION

Figure 1:
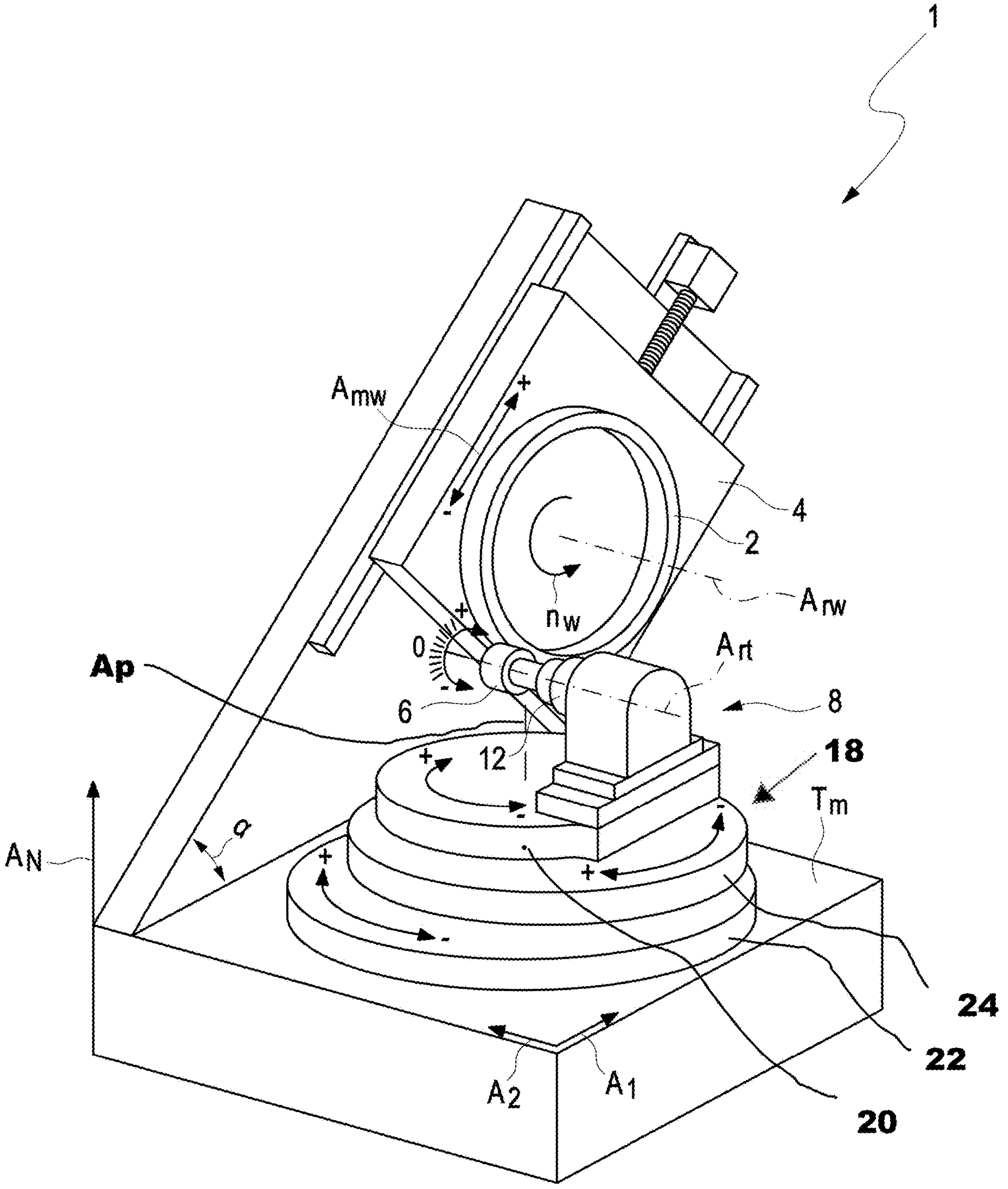
FIG. 1 is a perspective view of a device for machining a surface of a workpiece according to an embodiment of the present disclosure.

In the following same or similar functioning elements are indicated with the same reference numerals.

FIG. 1 shows a device 1 for machining a surface of a workpiece 2. The device 1 comprises a workpiece holder 4 configured to rotate the workpiece 2 about a workpiece rotational axis $A_{rw}$ with a rotational speed $n_w$. The workpiece 2 may be a bearing component such as an inner ring, an outer ring, and/or a rolling element.

The device 1 further includes a tool 6 having a tool rotational axis $A_{rt}$. The tool 6 is arranged in a tool holder 8 that is mounted on a holder support 18 comprising a first disk 20, a second disk 22 and a third disk 24 mounted for independent rotation about a common pivot axis $A_p$. The holder support 18 is configured to position and move the tool holder 8 and the tool 6 with respect to the workpiece 2. In particular, the tool holder 8 holds the tool and the holder support 18 moves the tool in a mounting plane $T_m$, wherein the tool rotational axis $A_{rt}$ is parallel to the mounting plane. The tool 6 can engage the external circumference of the workpiece 2 to produce a rotationally symmetric exterior surface of the workpiece 2. Also, an interior surface of the workpiece 2 can be produced. End faces of the workpiece 2 can also be machined if the tool rotational axis $A_{rt}$ is positioned perpendicular to the workpiece rotational axis $A_{rw}$.

The tool 6 includes at least one blade 10 (FIG. 2) having a blade curvature defined by at least one radius. The holder support 18 is further configured to position the tool 6 such that an active point of the blade 10 comes into engagement with the workpiece 2. In addition, the holder support 18 is also configured to pivot the tool 6 with a pivot motion about the pivot axis $A_p$ perpendicular to the tool rotational axis $A_{rt}$ and to move the tool with an advancing motion such that the active point of the blade shifts along the blade 10. Preferably, an angle around which the tool is pivoted is determined based on the blade curvature. For example, the pivot motion and the advancing motion may be performed simultaneously by the holder support 18. That is, the tool is pivoted while the tool is moved with advancing motion.

The holder support 18 can also be configured to vary a speed of the pivot motion. The advancing motion is defined by a curve having at least a first radius of curvature and a second radius of curvature. Using an advancing motion having at least a first radius of curvature and a second radius of curvature allows to machine not only straight surfaces but also surfaces that are curved such as a raceway of a ball bearing.

In FIG. 1, the workpiece holder 4 is further configured to move the workpiece 2 along an axis $A_{mw}$ which is perpendicular to the workpiece rotation axis $A_{rw}$. As can be seen from FIG. 1, the axis $A_{rm}$ and the mounting plane $T_m$ of the tool define an inclination angle α between them, wherein the inclination angle α is between 0° and 90°. Preferably, the inclination angle α is 45°.

Furthermore, the tool holder 8 includes a tool carrier 12 that can be rotated around the tool rotational axis. One or more circumferential tools can be arranged along the circumference of the tool carrier. If several tools are provided, they can be shaped identically so that when one tool 6 becomes worn out the tool carrier 12 can be advanced to a new tool. It is also possible to mount differently shaped tools on the tool carrier, which can then be used optionally to produce various surfaces. Even when several tools 6 are arranged on the circumference of the tool carrier 12, only one of these tools 6 is used at a time during the machining process.

The holder support 18 is configured to move the tool along a first axis $A_1$ and a second axis $A_2$, wherein the first axis $A_1$ and the second axis $A_2$ are perpendicular to each other and define the mounting plane $T_m$ of the tool 6, as well as to rotate the tool around a normal vector $A_N$ of the mounting plane $T_m$ of the tool 6. A holder support 18 configured as described above allows the tool to move in an advancing motion that has at least two radii of curvature and preferably a varying radius of curvature.

FIG. 2 shows the tool 6 of FIG. 1 in detail. The blade 10 is arranged at the tool 6. The blade 10 of FIG. 2 is shaped as a helical curve coaxial to the tool rotational axis $A_{rt}$. However, the blade may have any other shape. For example, the blade may have an elliptical shape. Additionally or alternatively, the tool 6 may be provided with more than one blade, preferably two to five blades.

Furthermore, the blade 10 is made from a material having a hardness greater than a hardness of a material of the workpiece 2. For example, the blade may be made of cubic boron nitride (CBN), ceramic, and/or diamond. Furthermore, the blade may be inclined from 10° to 30° relative to the surface to be machined The blade 10 may be fixed to the tool with any suitable fastening method. In particular, the blade 10 may be press-fitted, interference-fitted, and/or materially bonded to the tool 6. For example, the blade 10 may be glued and/or fixed to the tool 6 with a tongue and groove connection.

FIG. 3A to 3C show how the tool 6 and blade 10 move over a surface to be machined 14. Because the blade 10 only engages with its active point 16 only relatively minor cutting forces occur, even in the case of a wider blade. As can be seen in FIG. 3A to 3C, the active point 16 of the blade 10 shifts along the blade 10 as the tool 6 is moved and pivoted.

Figure 4:
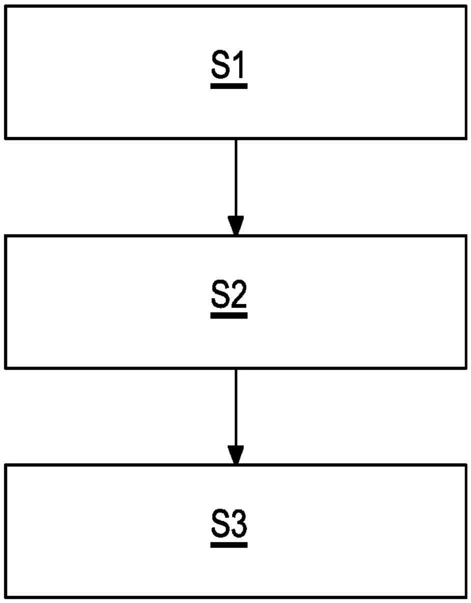
FIG. 4 is a flow diagram of a method for machining a surface of a workpiece according to an embodiment of the present disclosure.

FIG. 4 shows a flow diagram of a method for machining a surface of a workpiece. The method of FIG. 4 comprises the step S1 of rotating the workpiece 2 about a workpiece rotational axis $A_{rw}$. Furthermore, the method includes the step S2 of moving a tool 6 having a tool rotational axis $A_{rt}$ and at least one blade 10 such that an active point 16 of the blade 10 comes into engagement with the workpiece 2, and the step S3 of pivoting the tool 6 with a pivot motion about the tool rotational axis $A_{rt}$ and moving the tool 6 with an advancing motion such that the active point 16 of the blade 10 shifts along the blade 10, wherein the advancing motion is defined by a curve having at least a first radius of curvature and a second radius of curvature. Preferably, the method further comprises parameterizing the surface to be machined, and determining the advancing motion based on the parameterized surface to be machined.

In summary the described method and device for machining a workpiece allows twist-free surfaces to be obtained without the need for additional machining processes such as grinding, belt grinding, superfinishing, machining in hardened material and/or finish rolling. The described method and device also allow for machining surfaces that are curved, particularly in a direction of the tool rotation axis. For example, the device 1 and method can be used to machine bearing components for various types of bearings such as tapered roller bearing, deep groove ball bearing, angle contact ball bearing, spherical roller bearing and/or plain bearings.

What is claimed is:

1. A device for machining a surface of a workpiece, comprising:
- a workpiece holder configured to rotate the workpiece about a workpiece rotational axis,
- a tool having a tool rotational axis and at least one blade having a blade radius of curvature,
- a tool holder configured to position the tool such that an active point of the blade comes into engagement with the workpiece, and
- a holder support comprising a first disk, a second disk and a third disk, the second disk being stacked on the third disk and the first disk being stacked on the second disk and the tool holder being mounted on a top surface of the first disk, the first, second and third disks being independently rotatable about at least one disk axis perpendicular to the tool rotational axis,
- wherein the first, second and third disks are controllable to pivot the tool holder about the at least one disk axis with a pivot motion and to move the tool with an advancing motion such that the active point of the blade shifts along the blade, and
- wherein the pivot motion and the advancing motion are produced by a rotation of the first, second and/or third disks.

2. The device according to claim 1, wherein the holder support is configured to perform the pivot motion and the advancing motion simultaneously.

3. The device according to claim 1, wherein the advancing motion moves the tool along a path having a varying radius of curvature.

4. The device according to claim 1, wherein an angle of the pivot motion is determined based on the blade curvature and/or a curvature of the surface to be machined.

5. The device according to claim 1,
- wherein the holder support is configured to move the tool along a first axis and a second axis, the first axis and the second axis being perpendicular to each other and defining a mounting plane of the tool.

6. The device according to claim 1,
- wherein the workpiece holder is further configured to move the workpiece along a fourth axis perpendicular to the workpiece rotation axis,
- wherein the fourth axis is inclined relative to the mounting plane of the tool at an angle of between 0° and 90°.

7. The device according to claim 1, wherein the surface to be machined is rotationally symmetric with regard to an axis of symmetry and has a curvature in an axial direction of the axis of symmetry.

8. The device according to claim 7, wherein the blade curvature is smaller than the curvature of the surface to be machined.

9. The device according to claim 1, wherein the holder support is further configured to vary a speed of the pivot motion.

10. The device according to claim 1, wherein the at least one blade is made from a material having a hardness greater than a hardness of a material of the workpiece.

11. The device according to claim 1, wherein the at least one blade comprises two, three, four or five blades.

12. The device according to claim 1, wherein the at least one blade is inclined with respect to the surface to be machined at an angle of 10° to 30°.

13. A system comprising:

the device according to claim 1, and the workpiece.

* * * * *